US011593782B2

(12) United States Patent
Chau

(10) Patent No.: US 11,593,782 B2
(45) Date of Patent: Feb. 28, 2023

(54) FUELING STATION TRANSACTION SYSTEM AND METHOD

(71) Applicant: Wunchun Chau, Jacksonville, FL (US)

(72) Inventor: Wunchun Chau, Jacksonville, FL (US)

( * ) Notice: Subject to any disclaimer, the term of this patent is extended or adjusted under 35 U.S.C. 154(b) by 181 days.

(21) Appl. No.: 16/590,916

(22) Filed: Oct. 2, 2019

(65) Prior Publication Data

US 2020/0111074 A1 Apr. 9, 2020

Related U.S. Application Data

(60) Provisional application No. 62/740,623, filed on Oct. 3, 2018.

(51) Int. Cl.
*G06Q 20/20* (2012.01)
*G06Q 20/32* (2012.01)
*B67D 7/30* (2010.01)
*B67D 7/04* (2010.01)

(52) U.S. Cl.
CPC ........... *G06Q 20/204* (2013.01); *B67D 7/308* (2013.01); *G06Q 20/3278* (2013.01); *B67D 2007/0442* (2013.01)

(58) Field of Classification Search
CPC .. G06Q 20/204; G06Q 20/3278; B67D 7/308; B67D 2007/0442
See application file for complete search history.

(56) References Cited

U.S. PATENT DOCUMENTS

| D648,374 | S | 11/2011 | Hidaka |
| 8,438,064 | B2 | 5/2013 | Berrio et al. |
| 9,135,615 | B1 | 9/2015 | Mutha |
| 2007/0034700 | A1 | 2/2007 | Poidomani et al. |
| 2008/0208758 | A1 | 8/2008 | Spiker et al. |
| 2014/0274314 | A1* | 9/2014 | Cage ................... G07F 17/3255 463/25 |
| 2014/0279561 | A1* | 9/2014 | Carapelli ........... G06Q 20/4012 705/72 |
| 2017/0061415 | A1 | 3/2017 | Stewart |
| 2017/0355588 | A1* | 12/2017 | Fieglein ................. G06Q 20/20 |
| 2018/0105412 | A1* | 4/2018 | Fieglein ................. B67D 7/106 |
| 2018/0368207 | A1* | 12/2018 | Carapelli ............. G06Q 20/202 |

* cited by examiner

*Primary Examiner* — A. Hunter Wilder
*Assistant Examiner* — Joseph M Mutschler
(74) *Attorney, Agent, or Firm* — Meunier Carlin & Curfman LLC

(57) ABSTRACT

A fueling station transaction system, method and retrofitting method, the system having a fuel pump dispensing fuel to individual customers; a forecourt controller; a terminal disposed within the fuel pump, the terminal comprising a processing unit, a secure card reader, an encryption module and a wireless communication module; the terminal being in wireless communication with a payment processor; one or more point of sale systems which communicate with the forecourt controller using established protocols; and a gateway device, wherein the terminal communicates wirelessly with the gateway device, and wherein the terminal and the forecourt controller communicate with each other only through the gateway device, and wherein the gateway device communicates with the forecourt controller using the established protocols of the point of sale systems. Also disclosed is a method of performing the payment transaction, and for retrofitting current fuel station systems to incorporate the system disclosed herein.

18 Claims, 9 Drawing Sheets

FUELING STATION TRANSACTION SYSTEM AND METHOD

BACKGROUND

The present invention relates generally to service or fueling stations at which fuel is dispensed. More particularly, the present invention relates to a fueling station transaction or payment system that retrofits with existing fuel pump peripherals. Retail fueling environments usually include a plurality of fuel dispensers or fuel pumps located in a forecourt area outside of a convenience store building. Typically, the fuel pumps will each be equipped with pay-at-the-pump capability so customers can perform fueling transactions using a user interface on the respective fuel pump. For example, the customer can present a credit or debit card using a card reader installed on the fuel pump's user interface to pay for the fuel without entering the convenience store. Internally, the pumps typically contain flow meters, pulsers, control electronics, valves, manifolds, and internal piping. Many of these components are subject to regulatory requirements to maintain a high degree of accuracy.

Accepting payment cards as a method of payment subjects various fuel pump components to security standards and regulations promulgated by the Payment Card Industry ("PCI") and/or EMV (Europay, MasterCard and Visa). These standards were created in an attempt to prevent fraud and other security issues that arise due to the acceptance of payment cards and the transmission of sensitive information associated with the payment cards, such as account number, account holder information, and personal identification numbers ("PIN"). Generally speaking, these standards and requirements must be met by both software and hardware components used to receive, store, transmit, or otherwise handle the sensitive information. This is also known as PCI compliance.

Existing retail fueling environments (as shown in prior art FIG. 1) provide an integrated system that enables fuel dispensing payment both in-store and pay at the pump. For in-store payments, each fueling station has a convenience store 10, also known as a C-store, for customers to interact with an attendant and pay for fuel or purchase other convenience store items, such as food, drinks or sundries. The C-store 10 can also be a kiosk or small enclosure that does not permit customer entry, with customer service provided via a window or transaction counter. Convenience stores utilize payment systems that have a back office system 20, one or more point of sale (POS) systems 30 and a forecourt controller 40.

The back office system 20 includes hardware and software that provides accounting, inventory, record management and other back office and convenience store operations and management services. In one embodiment, the back office system 20 has a server and one or more personal computers or terminals for employee access and use. The back office system 20 may also be cloud-based or located off-site and provides employees with remote access via a network, such as the Internet and or through personal computers or portable electronic devices. The back office system 20 communicates with each POS system 30 and with the forecourt area via a forecourt controller 40, each of which is discussed below. In another embodiment, the back office system 20 may be located partially on-site and partially in the cloud 99 where it may be accessed via a network, such as the Internet. The back office system 20 may track and provide management of POS system transactions, such as fuel, food, drink and goods purchases at the convenience store 10.

The convenience store 10 may have one or more POS locations for customers to make their purchases. A POS system 30 may include an electronic cash register (ECR) 31 for processing the purchase, tracking inventory and handling cash transactions.

Each electronic cash register 31 also provides for card payment transactions, such as Visa, Mastercard or payment by debit cards. For these types of payments, each point of sale system 30 includes a secure card reader (SCR) 32 for reading payment card information, whether via the card's magnetic strip, EMV, near field communication (NFC) or other form of contactless payment. Each POS system 30 may also have a PIN pad terminal (EPP) 33 for PIN entry in connection debit card transactions, or the entry of other information by a customer, such as their zip code, gratuities or payment confirmation information. In many cases, the secure card reader 32 and PIN pad terminal 33 are integrated into a single device, referred to as a payment terminal or payment device, that also includes a display screen, magnetic card reader and card insert for processing EMV card transactions. Each secure card reader 32 may communicate the payment card information to the electronic cash register 31 and back to the back office system 20 for card payment processing. Alternatively, the point of sale system 30, by either the electronic cash register 31 or card reader unit 32, or by a payment device, may communicate directly with a third party payment processor 98 to obtain authorization of the card payment transaction. The system transmits to the payment processor the credit card number, the PIN, and other block and transaction information, including pre-authorization and post authorization. For enhanced security, in one form of a PCI compliant system, for example, no PCI information is shared with the back office system 20 and, instead is communicated directly by the secure POS system 30, or its payment device, to the payment processor 98. Only non-PCI payment transaction data is shared with the back office system 20.

The convenience store 10 also includes a forecourt controller 40 which through direct communication lines 57 communicates with and serves as a controller for each fuel pump 50 located in the outdoor forecourt area. Each fuel pump 50 includes a number of peripherals 51 for facilitating payment at the pump and fuel dispensing. As an example, many existing fuel pumps have a secure card reader 52, a PIN pad 53, a near field communication (NFC) device 54, a printer 55, a gas dispenser 56 and a display 58.

The display 57 provides information to customers about the fueling station and services, and instructions, status and updates for payment and fuel dispensing. The secure card reader (SCR) 52, PIN pad (EPP) 53 and near field communications 54 peripherals are similar to those described above and used as part of the POS system 30 with the electronic cash register 31 within the convenience store 10. Because these peripherals 51 are located outside and are not regularly attended by convenience store staff, they may include added security, such a tamper-proof housing, and protective coverings or materials to protect against the elements. The fuel pump 50 may also include a printer 55 for generating receipts of payment transactions. Of course, the fuel pump also includes gas dispensers 56 for selecting the desired octane rating fuel and dispensing the fuel into a vehicle.

In many existing and legacy fuel pumps 50 each of these peripherals 51 is "dumb" in nature, i.e., each of the peripherals 51 lacks a processor and is dependent upon the forecourt controller 40 to control their activities. The forecourt controller 40 serves as a controller for each fuel pump 50 and its peripherals 51 and as an intermediary between each POS system 30 and the fuel pumps 50. The forecourt controller 40 may also facilitate card payment transactions for the fuel pumps 50.

In a conventional fueling station, the forecourt controller 40 controls the peripherals 51 of each fuel pump 50. With respect to the secure card reader 52 and PIN pad 53, the forecourt controller 40 may control when they are activated to read a magnetic card strip or accept a keypad entry. In other situations, the forecourt controller 40 may place them or itself into a listening mode that initiates a payment transaction or other activities when activated by a customer, such as by swiping a card or pressing one or more of the PIN pad keys. The secure card reader 52 and PIN pad 53 transmit the customer input to the forecourt controller 52, which then facilitates payment with the payment processor 98. The forecourt controller 40 may also control the display 58, communicating to the display 58 what information will be shared with the customer. Upon completion of an accepted or declined payment transaction, the forecourt controller 40 communicates and controls the printer 55 to print receipts.

The forecourt controller 40 also controls the gas dispensers 56. As an example, depending upon the fuel octane rating selected by a customer, the forecourt controller 40 will activate the appropriate fuel lines or pumps to deliver the selected gasoline to the customer's vehicle. It may also monitor the flow rates, number of gallons pumped, and when to start and stop the pumping cycles. The forecourt controller 40 processes and coordinates this information to provide the customer a display of the amount of fuel pumped, real time pricing, and then use that information to facilitate card payment at the fuel pump 50. As can be seen from the foregoing summary, the forecourt controller 40 directs and coordinates the activities of each fuel dispenser peripheral 51.

As explained above, the forecourt controller 40 processes card payment transactions made at the fuel pumps 50 for customers paying at the pump 50. To accomplish this, the forecourt controller 40 communicates with third payment processors 99. As part of this system, the forecourt controller 40 and each POS system 30 (or electronic cash register 31 or payment device) must be certified to communicate and engage in transactions with a third party payment processor 98. This is a certification for communicating between the fuel station's payment systems and the payment processor 98. The peripheral devices 51 are not individually certified and depend upon the forecourt controller 40 for these services. All requests and responses to and from the forecourt controller 40 to the payment processor 98 must match. This setup, configuration and certification requires software and the creation of scripts (rule writing). Depending upon the types of card payments that may be accepted (VISA, MasterCard, Discover or AMEX), and the methods of acceptable payment (magnetic strip, EMV, contactless payment and NFC), certification may be complex.

The forecourt controller 40 also communicates with the various POS systems 30 for customers paying inside for the fuel dispensing. Each electronic cash register (ECR) 31 is capable of initiating a fuel pump transaction, with payment using the electronic cash register's payment device and then communicating with the forecourt controller 40 to assign the outdoor pump 50 and effectuate the transaction and fuel pumping. Alternatively, the forecourt controller 40 may communicate with the back office system 20 which receives communications from each POS system 30. Accordingly, the forecourt controller 40 is a critical component of fuel station operation whether a customer pays inside or outside at the pump 50. When payment is inside, the point of sale system 30 handles the payment processing and communicates with the forecourt controller 40 to facilitate the fuel dispensing. When payment is made at the pump 50, the forecourt controller 40 handles the payment processing and the fuel dispensing.

All of these components, the back office system 20, each point of sale system 30 and the forecourt controller 40 may communicate using any conventional means, whether as part of a local area network (LAN), a wide area network (WAN) and including wired, wirelessly or via a cloud based solution in communication with each component.

Many if not most of the current fuel station payment systems are weak in terms of payment security, as the technology has surpassed their capabilities. Many existing and legacy fuel pumps 50 include secure card readers 52 and PIN pad 53 peripherals that are limited to processing card payments using prior or outdated technology. As an example, existing fuel pumps 50 were implemented and installed prior to adoption of EMV cards, contactless payment and/or the use of NFC for Apple Pay, Google Pay and other smartphone payment methods. Since the peripherals 51 in existing fuel pumps 50 are dumb and controlled by the forecourt controller 40, current replacement solutions require replacement or updates to the various peripherals 51 and updates and modifications to the existing forecourt controller 40 that controls them. Other known solutions require replacement of the entire system, which may include the fuel pumps 50, the underground fuel tanks, the peripherals 51, the complete back office system 20, forecourt controller 40 and each POS system 30.

Replacing existing equipment is costly and time consuming. As an example, fuel station owners may operate multiple fueling station locations that utilize different fuel pumps 50, peripherals 51, back office systems 20 and POS systems 30 at each locations. Equipment and software may have been purchased and installed at different times, or the stations acquired from pre-existing businesses who selected and installed different equipment. Additionally, a station's various fuel dispensing islands may have been added or built over different periods of time and incorporate different technologies. Accordingly, fuel stations and fuel pumps 50 may utilize different hardware, software and fuel dispensing peripherals 51, which increases the complexity of upgrading them.

Replacing an existing fuel station's fuel dispensing systems with up-to-date EMV and other card payment technologies can be costly and time consuming. The costs for system replacement can reach five hundred thousand dollars for a single fuel station and require weeks of station downtime resulting in revenue losses. The gas pumps 50 and forecourt controller 40 communicate with the station's underground tanks and associated pumps and controller components, which must also be replaced in connection with new pumps 50 and the forecourt controller 40. The extent of these replacements requires complete station shutdown during implementation and replacement of the fuel dispensing system. The costs and extent of this transition makes the process irreversible. The new system results in purchaser lock-in. A fueling station that is unsatisfied with a new system cannot rollback or reverse the decision without undergoing another significant capital expenditure and weeks of station downtime.

In many cases replacing some of the station's components is also not a reasonable alternative. Simply replacing existing secure card readers 52 and PIN pad 53 peripherals with EMV compatible equipment will not solve the problem because of certification requirements. As explained above, the forecourt controller 40 and each point of sale system 30 must be certified to work with the payment processor 98. The more recent implementation and requirements for Euro pay, Mastercard and Visa (EMV) adds another layer of complexity to this certification requirement. Certification to process EMV transactions (not including contactless payment or NFC) may take two or more years to complete the certification process. In comparison, the number of scripts needed to implement EMV increases from approximately forty scripts and rule writing for magnetic card strip processing to over forty thousand for EMV card payment processing.

Additionally, as part of the payment processing, the EMV credit card and card reader communicate with each other, and the payment processor 98, and the card company. Under the existing system for magnetic strip card payment processing, all communications are with the payment processor 98. There are other certification requirements as well, such as with each card brand (Visa, MasterCard, Discover and AMEX), and with payment application developers. The certifications also differ depending on whether payment is made via contact or contactless card payment.

Replacing some of the station's components or peripherals is also not a reasonable alternative for other reasons. Different fuel dispenser peripherals use different standards for communication, connectivity and cabling. The secure card reader 52, PIN pad 53 and other peripherals 51 may connect and communicate with the forecourt controller 40 using various and differing cabling standards, such as Ethernet, USB, RS232, and RS485. Replacement equipment must be compatible with the existing cabling or a complete station re-wiring may be necessary.

It is an object of this invention to provide a method and system for updating and retrofitting existing fueling station systems that address and eliminate the problems discussed above. It is an object to provide such a system and method comprising two primary components: (1) a smart terminal that is inserted into each fuel pump, which replaces at least the existing secure card reader and possibly additional existing peripherals, and which encrypts payment information for wireless transmission; and (2) an in-store gateway device that interfaces with the forecourt controller and wirelessly communicates with each smart terminal.

SUMMARY OF THE INVENTION

In brief summary, in certain embodiments the invention is a fueling station payment system comprising a fuel pump or multiple fuel pumps dispensing fuel to individual customers; a forecourt controller; a terminal disposed within the fuel pump, the terminal comprising a processing unit, a secure card reader, an encryption module and a wireless communication module; the terminal being in wireless communication with a payment processor; one or more point of sale systems which communicate with the forecourt controller using established protocols; and a gateway device, wherein the terminal communicates wirelessly with the gateway device, and wherein the terminal and the forecourt controller communicate with each other only through the gateway device, and wherein the gateway device communicates with the forecourt controller using the established protocols of the point of sale systems. In other words, the gateway device is structured such that the forecourt controller communicates with the gateway device in the same manner as it communicates with the point of sale devices, i.e., to the forecourt controller the gateway device is in effect no different from a point of sale device. The payment processing is accomplished solely via encrypted secure payment information transmissions between the terminal and the payment processor. In this manner installation of the system into existing fueling station payment systems can be accomplished without requiring any major changes to the forecourt controller or the overall payment system at a given fueling station. It is critical to the system that the terminals encrypt credit card and other secure payment information prior to any communications with the payment processor in order to insure the security of the user's information.

The invention as described above in certain embodiments further comprises the fueling station payment system wherein the terminal further comprises a display, an antenna, a power module, and a PIN pad; wherein said wireless communication between said terminal and said payment processor and between said terminal and said gateway device occurs by Internet through the cloud; wherein the gateway device comprises a processing unit, a communications module and a forecourt controller interface; wherein the gateway device further comprises a power module, an antenna and a programmable input module; and/or wherein the fuel pump further comprises a gas dispenser, a printer, a PIN pad and a display all in direct communication with the forecourt controller.

The invention is also a method of performing a fueling station payment transaction comprising the steps of providing a fueling station payment system comprising a fuel pump dispensing fuel to individual customers; a forecourt controller; a terminal disposed within the fuel pump, the terminal comprising a processing unit, a secure card reader, an encryption module and a wireless communication module; the terminal being in wireless communication with a payment processor; one or more point of sale systems which communicate with said forecourt controller using established protocols; and a gateway device, wherein the terminal communicates wirelessly with the gateway device, such as over the Internet through the cloud, and wherein the terminal and the forecourt controller communicate with each other through the gateway device, and wherein the gateway device communicates with the forecourt controller using the established protocols of the point of sale systems; receiving secure payment information from a user through the terminal and encrypting the secure payment information; and wirelessly communicating the encrypted secure payment information to a payment processor.

The invention is also a method of retrofitting a fueling station transaction system in a fueling station having a fuel dispensing pump, a legacy smart card reader installed in the fuel dispensing pump, the legacy smart card reader in direct communication with a forecourt controller; the method comprising the steps of removing the legacy secure card reader from the fuel pump dispensing fuel to individual customers; providing a terminal comprising a processing unit, a secure card reader, an encryption module and a wireless communication module; said terminal being in wireless communication with a payment processor such that encrypted secure payment information is transmitted between the terminal and the payment processor; replacing the legacy secure card reader with the terminal and using the power source of the legacy secure card reader to power the terminal; and providing a gateway device in communication with the forecourt controller and in wireless communication with the terminal.

DETAILED DESCRIPTION OF THE INVENTION

Figure 1:
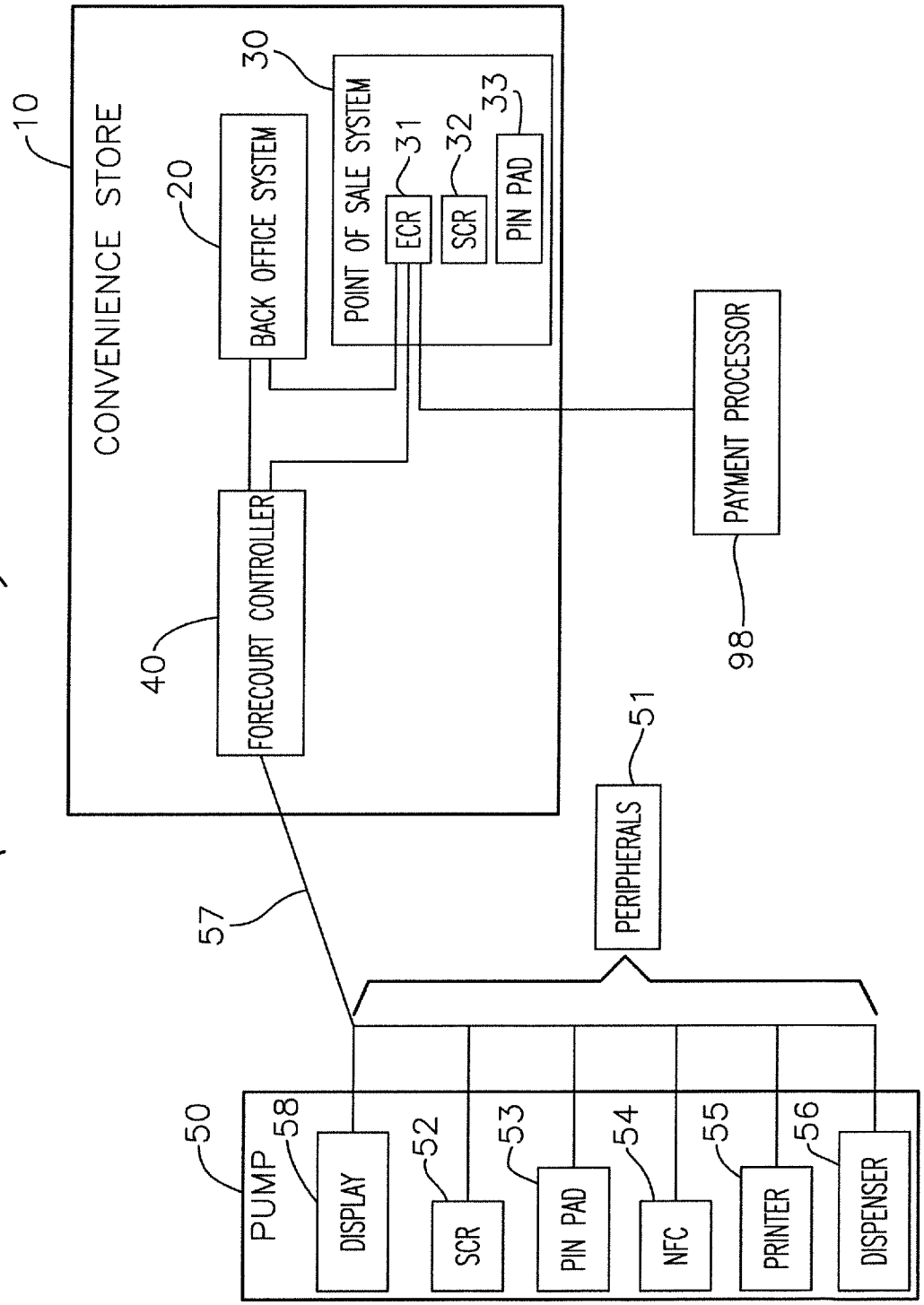
FIG. 1 is an illustration of a prior art fueling station system.
Figure 2:
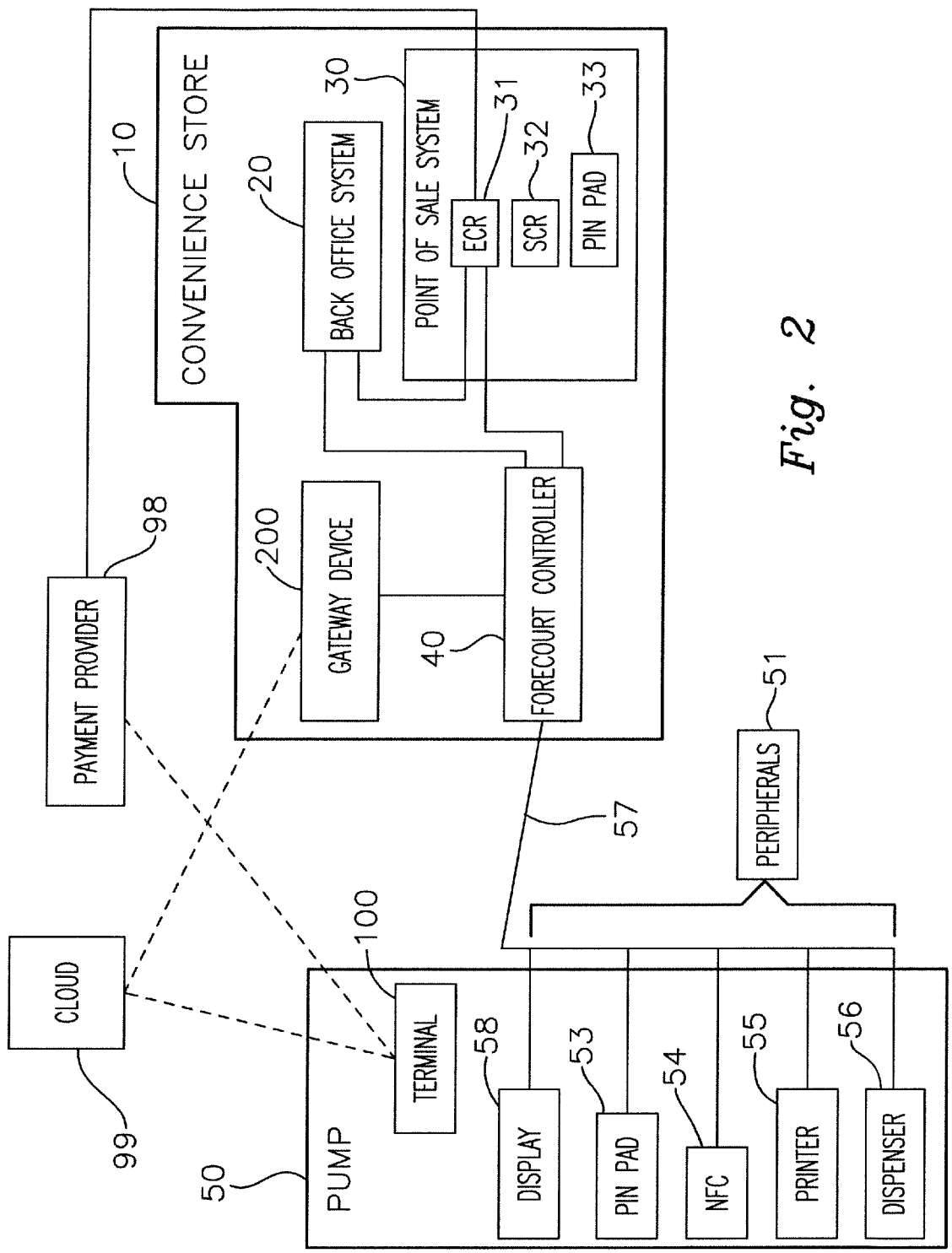
FIG. 2 is an illustration of a fueling station system incorporating the terminal and gateway device of the invention.

The present invention, in various embodiments comprises a method and system for updating and retrofitting a fueling stations, the system comprising a smart terminal 100 that replaces one or more of a fuel pump's existing peripherals 51 for accepting payment, payment processing and coordinating communication with the other components of the system to facilitate fuel dispensing, and a gateway device, bridge or proxy device 200 that interfaces with the existing forecourt controller 40 and communicates with the terminals 100, as shown in FIG. 2. As an example, the terminal 100 of the present invention may comprise an integrated unit that replaces both the secure card reader 52 and PIN pad 53 of a legacy fuel dispensing system.

The invention provides several advantages over the prior art solutions for updating existing fuel stations with EMV and other card payment reading equipment and peripherals. The terminal 100 does not require any new or additional wiring, and it utilizes the existing wiring from the legacy peripherals only for receiving power. The terminal 100 does not communicate directly with the forecourt controller 40. The terminal 100 may incorporate several ports or adapters on its rear side to enable it to receive power from any of the different and commonly used peripheral cables and connectors, such as USB, RS232, RS485, and Ethernet. The terminal 100 preferably has the same configuration as the peripheral 51 that is replaced so as to fit into the same opening without modification, metal cutting or modifications to the fuel pump 50 or its casing or housing.

Accordingly, the terminal 100 is not limited by the communication wiring or communication protocols of the legacy peripherals 51 or overall system. Each terminal 100 may be installed and operational relatively quickly.

The present invention also eliminates the need to replace a fueling station's entire system. The present invention's terminals 100 may be installed and deployed in fuel pumps 50 on one island or even on a single pump 50. Alternatively, the invention may be also incorporated into new fuel pumps 50 added to an existing fuel station. Station owners may roll-out the terminals 100 and present invention in a one or two pump pilot phase as part of the station's existing fuel dispensing and payment system without risking issues with other fuel pumps 50 or a complete station switch-over. Because the solution is limited to the replacement of a few peripherals 51, the present invention avoids the need to replace existing point of sale systems 30, electronic cash registers 31, back office systems 20, forecourt controllers 40, and other devices, software, equipment and peripherals.

Figure 3:
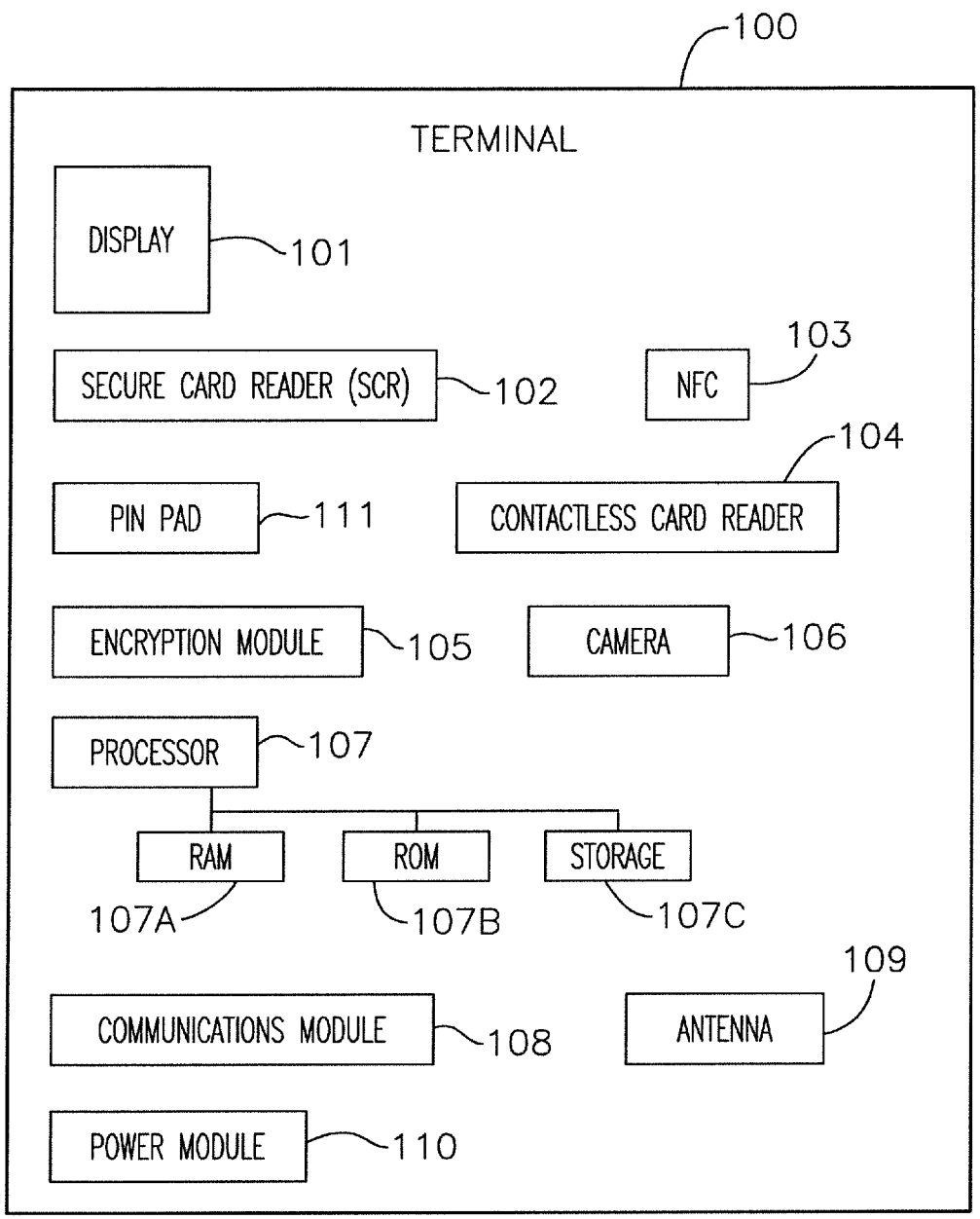
FIG. 3 is an illustration of the components of an embodiment of the terminal of the invention.
Figure 4:
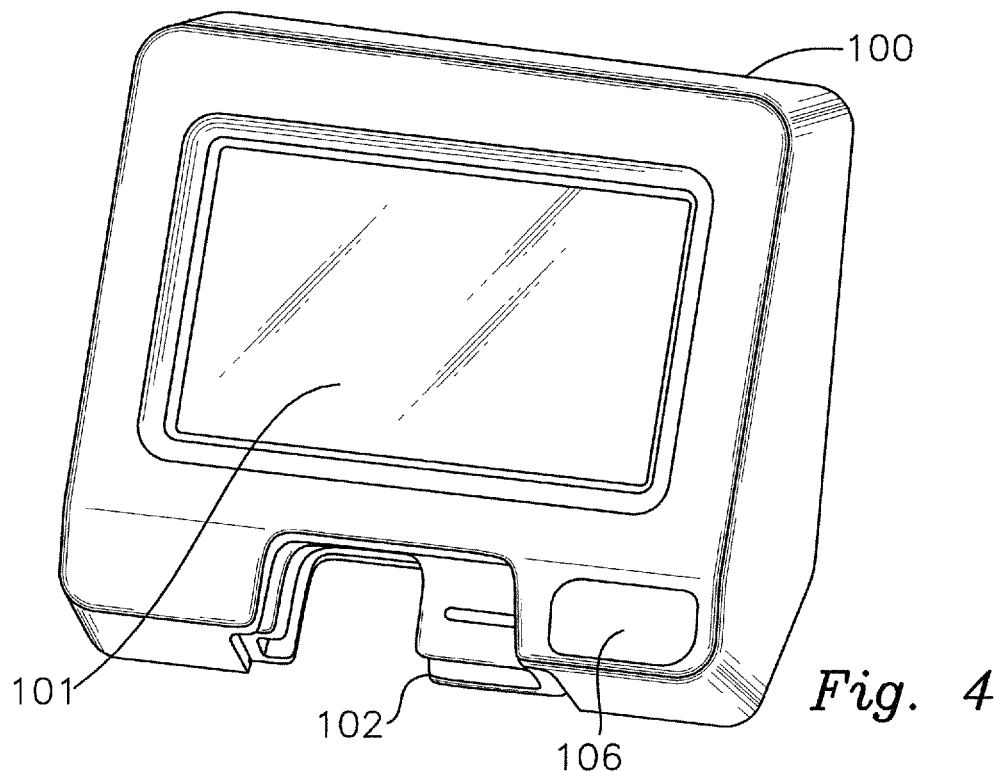
FIG. 4 is a front view of an embodiment of the terminal of the invention.
Figure 5:
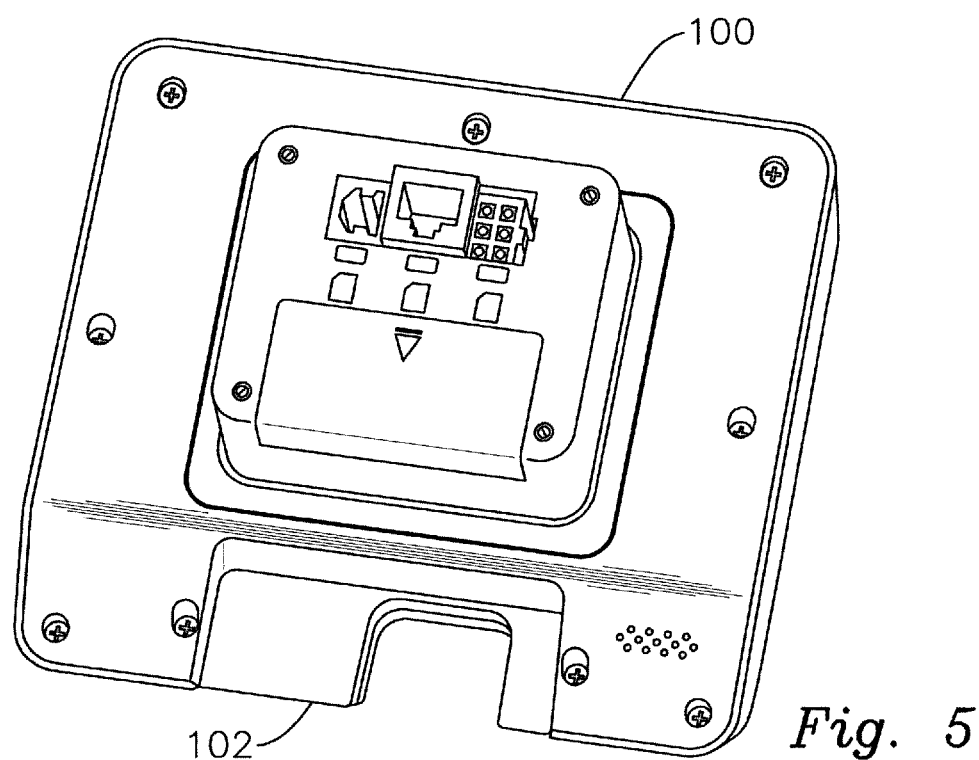
FIG. 5 is a rear view of an embodiment of the terminal of the invention.

In one embodiment, as shown in FIGS. 3 through 5, the terminal 100 may comprise a number of components, disposed internally or externally, to perform the payment processing and interfacing with a customer at a fuel pump 50 including a display 101, a secure card reader 102, a near field communication (NFC) module 103, a contactless card reader 104, an encryption module 105, a camera 106, a processing unit or controller 107, including RAM 107a, ROM 107b, and storage 107c, a wireless communications module 108, one or more antennae 109, and a power module 110. The terminal 100 may also include a PIN pad 11, which is optional if the display 101 is a touch screen.

The terminal 100 preferably incorporates into a single unit a number of the peripherals 51 that were previously installed and independently operated under legacy fuel pumps 50. In one preferred embodiment, the terminal 100 has a built-in secure hybrid card reader (HCR) which is capable of reading both magstripe (magnetic strip cards) and chip cards for use with EMV, a touch display that provides a virtual PIN pad and other data input, a contactless reader for NFC support, a contactless reader for EMV contactless payment support, and a camera with support for facial recognition, quick response codes (QR Codes) scanning and surveillance.

The terminal 100 includes a display 101 for displaying information at the pump 50 to a customer, including information about the station, transaction information such as pricing, transaction and payment status, fuel dispensing information and instructions for using the fuel pump 50 and making payment. The display 101 can be of any type with sufficient security and protections for outdoor use. The display 101 may be touch sensitive for receiving input from the customer. In one embodiment, the terminal 100 uses a display with PIN-On-Glass technology to provide a virtual keypad which can be customized, but it is still secured with the same hardware security module to protect the PIN and the key for encrypting the PIN. In an alternative embodiment, the display 101 is not touch sensitive and a separate user input device may be used, such as a PIN pad 111. The terminal 100 may also provide both a touch sensitive display 101 and the optional PIN pad 111 for those fuel station operators who prefer to have a physical keypad or both.

The secure card reader 102 of the present invention performs the services of a POS payment terminal card reader 32. Various forms of payment cards and card readers 102 are in wide spread use. The card readers 102 read various forms of card payments, such as smart cards, contactless payment cards using RFID, checks with optical characters and magnetic stripe cards. The magnetic stripe reader includes a slot into which a card is moved, for example, by hand past a reader (and possibly write head) to obtain the user and bank identification number.

Smart cards contain a microprocessor chip and memory and are capable of storing a far greater amount of information about participants in a commercial transaction. But the reader 102 for such a card is more complicated and requires that electrical contacts be made between the reader 102 and electrodes on the card, such as with EMV. The most familiar of these readers 102 is of the insert type where a card is inserted into a slot where it resides during the transaction. The reader 102 is capable of responding to the insertion of the card to ascertain the information recorded there. In one instance, electrical contacts are pressed against an inserted card in positions to contact electrodes on the card if such electrodes are present, such as with EMV cards. If no electrodes are present, of course, no contact is made and the positions of the contacts are irrelevant. The reader 102 also has a magnetic head positioned to read a magnetic stripe if it is present. If a card is both a smart card and a magnetic stripe card, the reader 102 has the capacity to read information from both recording systems and to relay information as appropriate. It is to be noted that magnetic stripe information is captured by moving a card with respect to a read head whereas information is obtained from a smart card over time while the card is maintained in a stationary position. Consequently, a smart card presently is locked in position by a resident locking device while a magnetic stripe card is positioned under user control and not captured.

The card reader 102 may also provide functionality for contactless payments. Certain payment chip cards contain an embedded chip and antenna that facilitates contactless payment. A customer waves their contactless card, or a fob or handheld device containing the payment information, over the card reader 102 or another are of the terminal 100. In a typical embodiment, the contactless payment card is required to be held within approximately three inches of the card reader 102 or terminal 100. The antenna allows the card's payment information to be transmitted to the terminal. The process may also include tapping the payment card against the card reader 102 or terminal 100 and the generation of a cryptographic code that is unique to the payment card and to the transaction is created. In sum, the card reader 102 is any device capable of reading payment card information, whether magnetically, using a chip reader for EMV, wirelessly or using any other conventional card reading technology for reading payment information from all different types and forms of payment cards to receive their card payment information. The contactless payment reader 104 may be a component of the secure card reader 102, a separate module, or a component of the near field communications (NFC) module 103.

It is understood that a number of the terminal's modules and components may be combined or integrated with one another into fewer modules or single module. For credit card payments, such payment can be by reading the magnetically coded information from the payment card's magnetic strip, or using a chip reader or other technology for utilizing EMV. In one embodiment, the car reader 102 is a secure hybrid card reader (HCR) which is capable of reading both magstripe and chip card (for use with EMV), and also incorporates the PIN Pad, NFC contactless reader for support of EMV contactless, camera with support for facial recognition, QR Code scanning and surveillance.

As referenced above, the terminal 100 may also include an optional PIN pad device 111 in communication with the one or more of the other components of the terminal 100, such as the display 101, and terminal processing unit 107. The PIN pad device 111 contains a series of buttons to enable a customer to enter information associated with a card payment transaction. The data entry may include a personal identification number (PIN), in the case of payment by a debit card, zip code or other verifying information for credit card payments, or any other type of information that may be required or necessary to facilitate a payment transaction.

The PIN pad device 111 securely transmits the input data to the terminal controller for further payment processing. For example, the inputted PIN pad entries may be encrypted by the PIN pad before transmission to the terminal processing unit 107. In an alternative embodiment, the functions of the PIN pad 111 may be handled by the touch sensitive display 101, which may display to the customer a virtual PIN pad or keyboard for entry of the information via the display 101, in which case no physical PIN pad 111 may be provided. Another embodiment may include a terminal 100 that allows both options to a customer, such that the customer's data may be entered by using either the display 100 and/or the PIN pad 111. The terminal's camera 106 may include security protocols that disable the camera 106 during certain portions of the customer's interaction with the terminal 100 and fuel pump 50, such as when a customer enters information into the physical PIN pad 111 or a virtual PIN pad provided by the display 101. These restrictions prevent recording of a customer's PIN or other information entry. The camera 106 may also be controlled or configured to take photographs of customers in connection with their transactions for security or authentication purposes. In one alternative embodiment, the customer images may be stored or transmitted for facial recognition or other biometric authentication or verification.

In addition to the camera 106, the terminal 100 may also include additional scanning modules for inputting or collecting other biometric data, such as a fingerprint scanner, a retinal scanner, or any other biometric data that may be collected, stored or used for transaction authenticate, verification or security.

The terminal 100 may also include a near field communication (NFC) reader 103 and a contactless card payment reader 104. The near field communication (NFC) contactless reader 103 provides support for EMV contactless acquisition of payment card information, such as Apple Pay or Google Pay. The contactless card reader 104 may facilitate contactless payment by other means, such as RFID as explained above. The near field communication (NFC) reader 103 and contactless card payment reader 104 may be separate modules, combined into a single module, or integrated as part of other components or modules, such as the secure card reader 102.

The terminal 100 may include a camera 106 for providing security, surveillance, transaction monitoring and facilitating payment, promotions and data collection. For example, the camera 106 may be utilized to capture coupons, promotions, customer loyalty cards or other data or information relevant to the customer, the payment transaction or the fuel dispensing process.

As an example, the camera 106 may capture or scan QR Codes, bar codes or other similar technology. The camera 106 is provided in a secure and weatherproof housing to protect against tampering, the elements, weather and vandalism. The camera 106 may also be deactivated as part of security protocols, such as for certain privacy concerns and to prevent the capture of customer entry of PINs and other information into a PIN pad 111 or a touch screen display 101.

The terminal 100 includes a processing unit 107 for controlling, managing and operating the terminal's components and providing processing and computing services for the terminal's operation and processing of card payment transactions. The processing unit 107 may include one or more microprocessors and associated RAM 107a for working memory, ROM 107b containing firmware and instructions, and local storage 107c for storing payment, transaction information, and any other data or information input, output, received or collected by the terminal 100. The processing unit 107 may include other circuitry necessary for the operation of the terminal 100, and its modules and components. This may include PIN entries, card payment information, payment processing and payment transaction information, recorded video and photographs from the camera 106, and any other data or information collected in connection with the terminal's operation or use. The storage 107c may be of any type, including flash memory, a hard drive, or additional RAM. The storage 107c may be local or remote, such as cloud-based. Data and information stored in the terminal 100, and particularly if stored remotely, may be encrypted by the encryption unit 105.

The processing unit 107 also provides computing and processing for facilitating payment card transactions. The processing unit 107 contains the coding and instructions for controlling the display 101 and information shown to the customer, obtaining the card payment information from the secure card reader 102, customer data entry via the PIN pad 111 or input from a touch-screen display 101, and the near field communication 103 and contactless payment 104 readers. The processing unit 107 may facilitate encryption of the information from the encryption module 105, or those components may also encrypt them by interfacing directly with the encryption module 105. The processing unit 107 stores transaction data for payment processing and communicates directly with the third party payment processor 98 for facilitating payment, obtaining pre and post authorizations and other payment processing functions. As explained above, certification is required for the payment equipment. The processing unit 107 includes the payment applications for processing card payment and possesses this certification and contains the scripts and rules for all forms of payment, thereby eliminated the need for any peripherals 51 or the forecourt controller 40 to be certified for EMV, NFC or other contactless payment certification. Because all payment processing and transactions are made directly between the terminal 100 and the payment processor 98, no additional certification or configuration is required for the fuel dispenser's other peripherals 51, the forecourt controller 40 or any devices, applications or peripherals of the convenience store 10 or its back office system 20.

The processing unit 107 may also include a programmable input module for updating the firmware, ROM or other coding of the terminal. This may include a port, such as a USB port with added security protocols to avoid tampering. The terminal 100 and processing unit 107 may also be programmed remotely or wirelessly using the same communications methods as those to communicate with the forecourt controller 40 or the payment processor 98.

The processing unit 107 also communicates with the forecourt controller 40, via the in-store gateway device 200, for controlling the other peripherals 51 of the fuel pump 50, such as the gas dispensers 56, printer 55 or an existing display peripheral 58. As explained below, the terminal 100 communicates wirelessly, such as through the cloud 99, with an in-store gateway device 200, which serves as an intermediary between the terminal 100 and the forecourt controller 40. The in-store gateway device 200 is in communication with the forecourt controller 40 and provides the necessary communications as if the fuel dispenser terminal 100 were still in direct communication with the forecourt controller 40. Using this configuration, there is no need for direct communication between the terminal 100 and the forecourt controller 40. Accordingly, installation and use of the terminal 100 will not require re-programming, modification or replacement of a convenience store's existing forecourt controller.

As explained below, in operation the in-store gateway device 200 communicates with the forecourt controller 40 using the same protocols and interface as if it was facilitating a fuel dispensing transaction like one of the convenience store point of sale systems 30, electronic cash registers 31 or payment devices for a pay inside fuel transaction. In an alternative embodiment, existing peripherals 51 may include the existing display 58, the printer 55 and the gas dispensers 56. The terminal processing unit 100 may coordinate the operation of those peripherals by communicating with the in-store gateway device 200 which then communicates with the forecourt controller 40 in the same manner as the legacy and former peripheral equipment 51.

The terminal 100 includes an encryption module 105 for encrypting and securely storing and maintaining PCI data, such as payment card information, payment transaction data and customer PINs and other data entry. The encryption module 105 may be an independent module or incorporated within other modules, such as the processing unit 107 or secure card reader 102. The encryption unit 105 stores one or more encryption keys for encrypting information in connection with its storage and communication and transmission to the payment processor 98, the in-store gateway device 200 or other destinations, such as the cloud 99. The encryption module 105 may also include additional security measures to prevent tampering, such as opening or physically accessing the encryption module 105, unauthorized access, and exposure to high or low temperatures. Encryption of payment information is an essential component of the terminal 100 within the system as described, such that the user's credit card and/or other payment information is kept secure.

The terminal 100 includes a wireless communications module 108 for providing communication services between the terminal 100 and the in-store gateway device 200, and between the terminal 100 and third party payment processors 99 or the cloud 99. The communications module 108 interfaces with the processing unit 107 to facilitate outbound and inbound communications. Communications between the terminal 100 and the in-store gateway device 200 are conducted wirelessly, such as via Wi-Fi, Bluetooth, 4G or any other wireless communication protocols or systems. The communications module 108 may use one or more antennae 109 for conducting wireless communications. The antenna 109 may be a separate module of the terminal 100 or incorporated into the communications module 108. In an alternative embodiment, the communications module 108 and/or antennae 109 may be incorporated into the processing unit 107.

The communications module 108 may also communicate using other devices that provide network connectivity or connections to the in-store gateway device 200 and/or a payment processor 98, such as a router or other device that provides wireless communications or WAN pr other network or internet access.

The terminal 100 may also include a speaker or other form of audio output and an associated audio controller, either as a component of the terminal 100 or as part of the processing unit 107. The audio output may provide for voice instructions, music or uses, such as ADA compliance. Alternatively, the audio output could be a buzzer or other sound for providing reminders or indicators to the customer, such as to remove their payment card or positive or negative feedback based upon the success or completion of a payment transaction.

The terminal 100 also includes a power module 110 for receiving power to operate the terminal 100, including the processing unit 107 and its other components and modules. The power unit 110 may be coupled with one or more ports or adapters located on the terminal's housing for receiving power from external power sources. As explained above, the legacy and former peripherals 51 were physically connected to the forecourt controller using commonly used cabling, such as USB, MDB, RS232, RS485 and Ethernet. In one embodiment, the terminal only uses the power and ground lines from the legacy cables. The terminal 100 preferably has multiple ports and adapters for receiving any of these legacy cable types for providing power and ground. This configuration alleviates concerns and compatibility with communications between the terminal 100 and the forecourt controller 40 because support for the legacy line protocols is not required.

The terminal 100 may have one or more ports for receiving each of these different types of cables for power. It may also be equipped with fewer ports and utilize adaptors, pigtails or other intermediary connectors. In another embodiment, the terminal 100 may receive power from another source, such as solar, rechargeable batteries, or from another power supply, such as a tap into a power source utilized by the fuel pump 50 or its other peripherals 51. By using only the power and ground lines from the existing fuel pump's legacy cabling, the terminal 100 can be easily retrofit into the pump 50 without needing to support the legacy communications cable protocol.

The terminal 100 is enclosed within a secure and tamper proof housing. The terminal 100 is designed to be rugged, element-resistant and can be used for both indoor and outdoor use. The indoor use may be part of an electronic cash register (ECR) system 31. The outdoor use may include its installation and use at a fuel pump 50 for pay at the pump convenience. The terminal 100 is configured and designed for use and incorporation into existing fuel pumps 50 by having a retrofit design comprising the same configuration and dimensions as, for example, an existing pump's secure card reader (SCR) 52 used to accept a magstripe card. The terminal's installation may be performed relatively quickly by disconnecting the cabling from the legacy secure card reader 52, removing the screws or fasteners that secured the card reader 52 to the fuel pump 50, removing the unit 52, inserting the terminal 100, reconnecting the power cabling, and screwing the terminal 100 to the fuel pump using the same screws or fasteners. In one example, the legacy card reader 52 is secured by four Phillips screws, which may be reused to affix the terminal 100 into the same opening left by the former secure card reader 52. In this embodiment, the old card reader 52 and terminal 100 may be swapped using a single Phillips head screw driver and four screws.

A majority of gas stations are already equipped with existing secure card readers (SCR) 52 in the pump 50 to accept card payment. On its rear side, the terminal 100 has an insert, which may be a small insert that is smaller than the opening left after removing an existing legacy secure card reader 52. In one embodiment the terminal's rear side insert is 72.83 mm×72.83 mm.

In another embodiment, the terminal 100 may utilize an insertion adaptor to allow the terminal 100 to retrofit into different types of existing pumps 50 having different sized openings left by various makes, models and forms of secure card readers 52. The terminal 100 may also include a canopy which acts as a visor or covering to provide further protection against direct sunshine and allow the screen to be seen behind the shade created by the canopy. The canopy may extend the life of the display screen. Constant or continuous sunlight exposure can cause a fading screen, particularly when used outdoors as part of a fuel dispenser system.

In addition to fitting the terminal 100 into the existing opening left by the former secure card reader 52, the terminal 100 may also utilize the existing wiring or cabling of the former reader 52 to obtain power. One embodiment of the invention utilizes the existing cabling from the former secure card reader 52, thereby avoiding the need to rewire or run new cables from the convenience-store 10 to the outdoor fuel pump 50.

In many situations, the former legacy secure card reader 52 is wired to the convenience store 10 and existing system using standard wiring, such as USB, MDB, RS232, RS485, Ethernet or others. All of this cabling serves two critical functions with the secure card reader 52. First, they provide a power and ground to the secure card reader 52. Second, they provide the communications protocols and connectivity between the reader 52 and the forecourt controller 40. In the present invention, and in contrast, the terminal 100 communicates with the forecourt controller 40 independent of the cabling. The terminal 100 uses wireless communications to communicate with the in-store gateway device 200, which then communicates with the forecourt controller 40. Accordingly, the terminal 100 only needs to connect to the existing fuel pump cabling to receive power and a ground. As an example, the terminal 100 may have ports for receiving USB, MDB, RS232, RS485, Ethernet and other commonly used cabling. In alternative embodiments, the terminal 100 has one or more ports for receiving different cables for power, or may have fewer ports and utilize adaptors, pigtails or other intermediary connectors.

In another embodiment, the terminal 100 may receive power from another source, such as solar, rechargeable batteries, or from another power supply, such as a tap into a power source utilized by the fuel pump 50 or its other peripherals 51. By using only the power and ground lines from the existing fuel pump's legacy cabling, the terminal 100 can be easily retrofit into the pump 50 without needing to support the legacy communications cable protocol.

In an alternative embodiment, in addition to relying on the legacy cabling for power and ground only, the terminal 100 may use legacy cabling that provide a protocol that supports TCP/IP, which includes Ethernet, and wireless communication methods including Wi-Fi or Bluetooth. In this configuration, the terminal 100 may communicate with the cloud 99 which in turns communicate with the in-store gateway device 200. The cloud 99 may be running in a remote server or a server on premises inside the convenience store. When the cloud service is running in a remote server it has the advantage of allowing the owner of multiple sites to have insights into what each site is doing in real-time and be able to support troubleshooting remotely.

The invention also includes a gateway device, proxy or bridge device 200, to be typically located in the convenience store 10. The gateway device 200 enables communication and interfacing between one or more terminals 100 and the forecourt controller 40. The gateway device 200 serves as an intermediary between the forecourt controller 40 and the terminals 100. The gateway device 200 connects with the terminals 100 and with the forecourt controller 40 to communicate between the two. Communication between the terminals 100, the gateway device 200, and the forecourt controller 40 may be via a physical network, such as a LAN, or wirelessly, via Wi-Fi, Bluetooth, 4G or any other known or conventional wireless connectivity.

In one embodiment, the communications between and one or more of the terminals 100 and the gateway device 40 are conducted wirelessly via a cloud services 99. The cloud services 99 may operate on a remote server or a server located onsite at the convenience store 10. When the cloud service 99 is running on a remote server, it has the advantage of allowing the owner of multiple sites to have access to data and real time information about each site and its fuel dispensing and payment activities. This may also facilitate remote support and troubleshooting. The cloud service 99 may also provide additional features such as a portal for management, a workflow engine for adding additional logics, a report engine and other management, accounting and network and systems tools, data collection, reporting and tracking.

A single gateway device 200 may also connect and interface with multiple terminals 100, including all terminals 100 and fuel pumps 50 in the station's forecourt area. When using a cloud based or wireless connection between the gateway device 200 and the terminals 100, the gateway device 200 may remain in a listening mode and interact with terminals 100 upon their sending an initiation, wake-up or request to the gateway device 200. The gateway device 200 and the terminals 100 may also include authentication and handshaking procedures and protocols to prevent hacking, tampering and unauthorized access. When first placed in use, the gateway device 200 and terminals 100 may be paired.

Each terminal 100 communicates with the gateway device 200 to provide information necessary for the forecourt controller 40 to complete a fuel dispensing transaction. This includes the same types of information that each of a fuel pump's peripherals 51 may otherwise communicate directly to the forecourt controller 40. This may include secure card payment requests and information, NFC and contactless card payments, camera activation and data, printer activation and receipt generation, and controlling the display 58. Of course, the forecourt controller 40 will utilize this information to facilitate fuel dispensing, including pump 50 activation, fuel tracking, tank pumping and activation, and displaying dispensing information on the display 58.

The forecourt controller 40 communicates with the gateway device 200 as if it were communicating with the legacy fuel dispensing peripherals 51 directly. In this embodiment, the forecourt controller 40 interfaces, with the gateway device 100 via the same peripheral communications protocols. As is the case with the legacy system, the forecourt controller 40 communicates with the back office system 20 regarding payment transactions, fuel dispensing, quantities and other customer transaction and fuel dispensing data and information.

The gateway device 200 communicates with the forecourt controller 40 using the same communications methods and protocols as the convenience stores electronic cash registers 31 and/or point of sale systems 30. As explained above, the forecourt controller 40 communicates with the various POS systems 30 for customers paying inside for fuel dispensing. Each electronic cash register 31 is capable of initiating a fuel pump 50 transaction, with payment using the electronic cash register's payment device and then communicating with the forecourt controller 40 to assign the outdoor pump 50 and effectuate the transaction and fuel pumping. The gateway device 200 communicates with the forecourt control 40 using the same authentication, handshaking, communications, requests and protocols as the point of sale system 30 and electronic cash registers 31. In this embodiment, no customization, replacement or additional program may be required of the forecourt controller 40. Instead, the gateway device 200 interfaces and interacts with the forecourt controller 40 as if it is processing and requesting fuel dispensing transactions as an in-store purchase or pay inside fuel transaction through the ECR's 31. The gateway device 200 communicates with the forecourt controller 40 using the forecourt controller's 40 existing interface, protocols and functionality. In this configuration, the terminal 100 handles the payment processing in the same manner as the electronic cash register 31 and its payment terminal, and communicates with the forecourt controller 40 regarding that transaction and to request activation and control of the fuel pump 50 for the customer to pump the gas and complete the transaction. According to this embodiment, there is no need for customized integration between the terminal 100 or gateway device 200 and the forecourt controller 40, so retrofitting existing systems is easily accomplished.

Figure 6:
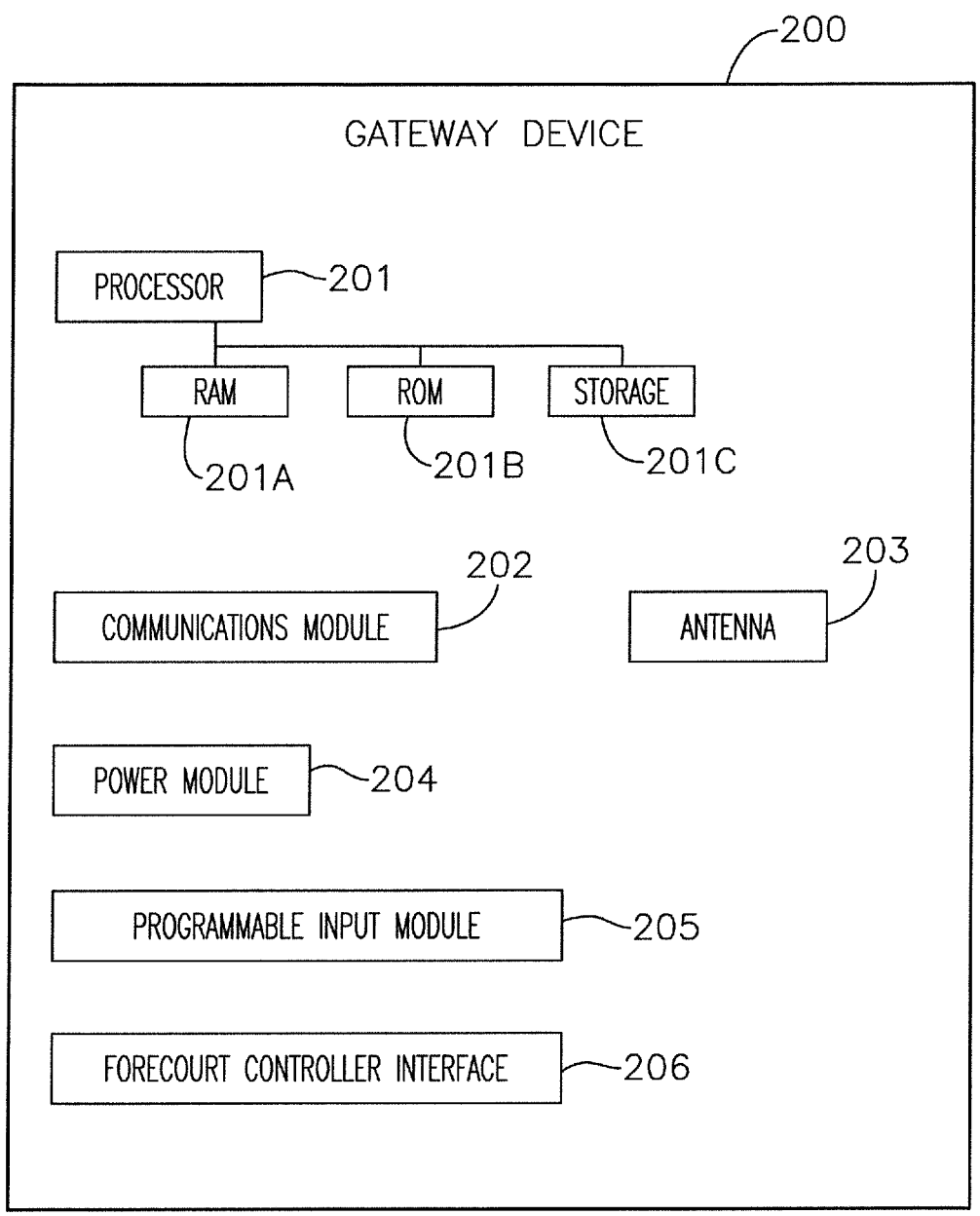
FIG. 6 is an illustration of the components of an embodiment of the gateway device of the invention.

With this system, the forecourt controller 40 continues to control and operate the various fuel dispenser's peripherals 51 to facilitate gas pumping as if the card payment transaction conducted at the terminal 100 in the forecourt area were consummated within the convenience store 10 as a pay inside transaction with the electronic cash register 31 and/or point of sale system 30. A preferred embodiment of the gateway device 200 has at least the following components: a processing unit 201 including one or more microprocessors, RAM, ROM and storage, a communications module 202, one or more antennae 203, a power module 204, a programmable input module 205, and a forecourt controller interface 206, as shown in FIG. 6.

The gateway device 200 includes a processing unit 201 for controlling, managing and operating the gateway device's 200 components and providing processing and computing services for the gateway device's 200 operation and processing of communications between one or more of the terminals 100 in the forecourt area and the forecourt controller 40. The processing unit 201 may include one or more microprocessors and associated RAM 201A for working memory, ROM 201B containing firmware and instructions, and local storage 201C for storing related data and information. The processing unit 201 may include other circuitry necessary for the operation of components and modules. The storage may be of any type, including flash memory, a hard drive, or additional RAM. The storage may be local or remote, such as cloud-based 99. Data and information stored in the terminal 100, and particularly if stored remotely, may be encrypted by the terminal's encryption module 105.

The processing unit 201 also provides computing and processing for facilitating communications between each terminal 100 and the forecourt controller 40. The processing unit 201 contains the coding and instructions for listening for and receiving instructions from one or more terminals 100 via the gateway device's communications module 202, processing that information and data and sending corresponding instructions to the forecourt controller 40 in a format and using the protocols of an electronic cash register 31 and point of sale system 30 providing pay inside or pay at the pump fuel dispensing purchases and transactions. Payment processing is handled by each terminal 100 independently of the gateway device 200. Accordingly, no certification is required for the gateway device 200.

The gateway device 200 or its processing unit 201 may also include a programmable input module 205 for updating the firmware, ROM or other coding of the terminal 100. This may include a port, such as a USB port with added security protocols to avoid tampering. The gateway device 200 and processing unit 201 may also be programmed remotely or wirelessly using the same communications methods as those to communicate with the terminal 100 or forecourt controller 40.

The gateway device 200 includes a communications module 202 for providing communication services between each terminal 100 and the gateway device 200. The communications module 202 interfaces with the processing unit 201 to facilitate outbound and inbound communications. Communications with the terminal 100 may be conducted wirelessly, such as via Wi-Fi, Bluetooth, 4G or any other wireless communication protocols or systems. The communications module 202 may use one or more antennae 203 for conducting wireless communications. The antenna 203 may alternatively be a separate module of the terminal 100 or incorporated into the communications module 202. In an alternative embodiment, the communications module 202 and/or antennae 203 may be incorporated into the processing unit 201.

The communications module 202 may also communicate using wired or physical connections in addition to, or in lieu of wireless communications. As an example, the gateway device 200 may have a physical connection to another device that provides network connectivity or connections to the terminal 100. In another embodiment, the physical connection may be to a router or other device that provides wireless communications or WAN or other network or internet access.

The communications module 202 may also provide communication services between the gateway device 200 and the forecourt controller 40. If the communications module 202 is used for communications between the gateway device 200 and the forecourt controller 40, then such communications with the forecourt controller 40 will be transmitted, received and conducted using the same communications, formats and protocols as those used by the convenience store's point of sale system 30 and electronic cash registers 31, or, if the forecourt controller 40 allows for alternative communications interfaces, then also by using any such other protocols, formats or means of communicating or interfacing as provided by the forecourt controller 40. It will be known by those of ordinary skill in the art that electronic cash registers 31, payment devices and point of sale systems 30 may communicate with forecourt controllers 40 in a number of ways, whether wirelessly or using cabled or physical connections.

In an alternative embodiment, the communications between the gateway device 200 and the forecourt controller 40 are provided by a forecourt controller interface 206 included as a component of the gateway device 40 rather than by using the communications module 202. The forecourt controller interface 206 may be an interface specific to certain makes, models or types of forecourt controllers 40, or for forecourt controllers 40 that cannot interface or communicate using the communications module 202. It will be known by those of ordinary skill in the art to incorporate or configure a forecourt controller interface 206 to communicate with a forecourt controller 40 in the same way as communications between the forecourt controller 40 and electronic cash registers 31, payment devices and point of sale systems 30. The gateway device 200 also includes a power module 204 for receiving power to operate the gateway device 200 including the processing unit 20 land its other components and modules.

Installation of the present invention into an existing or legacy system of a convenience store 10 and the fuel pumps 50 of its fuel dispensing islands is relatively quick and can be performed incrementally. The invention requires installation of the gateway device 200 and at least one terminal 100. Terminals 100 may be installed into one or more of the existing forecourt area's fuel pumps 50. The housing of an existing fuel pump 50 is opened and its existing secure card reader 52 is disconnected from its cabling and then removed. In many cases, the secure card reader 52 may be removed using a single Phillips screw driver and the four screws fastening the device to the fuel pump 50. The terminal 100 is then inserted into the opening left by the removed legacy secure card reader 52. Since the terminal 100 is structured to have the same form factor as the old card reader 52, there is no need to cut, alter or damage the existing fuel pump's 50 housing or enclosure. The existing power cabling from the legacy card reader 52 is connected to one of the ports or adapters on the rear side of the terminal 100. As explained above, in one embodiment the terminal 100 only uses the cabling for power and ground because all other communications are conducted wirelessly with the gateway device 40, such as by Wi-Fi, Bluetooth, or a 4G network. Once connected, the terminal 100 is fastened to the fuel pump 50 using the same screws and form factor as the legacy card reader 52. The fuel pump 50 may then be closed and the terminal 100 is ready for use.

The gateway device 200 may be installed within the convenience store 10, such as in the same secure area as the forecourt controller 40 or elsewhere. Because the gateway device 200 communicates with the forecourt controller 40 using the same communications methods as the point of sale system 30 and electronic cash registers 31, it may be located or setup in similar fashion. The gateway device 200 and each terminal 100 may require an initial setup that involves authentication, handshaking and other protocols to confirm a secure and verified connection between them. When first placed in use, the gateway device 200 and the forecourt controller 40 may be paired. Similarly, the gateway device 200 is authenticated and setup for communication and use with the forecourt controller 40 using the same protocols as each point of sale system 30 and electronic cash register 31. As explained above, the forecourt controller 40 "sees" the gateway device 200 as another point of sale system 30 or electronic cash register 31 and is configured for such use.

As can be seen from the descriptions and installation summaries above, the present invention works with any fuel dispensing systems that utilize conventional fuel dispensing pumps 50 and peripherals 51. In some cases, installation can be completed within thirty minutes by replacing one fuel pump's 50 existing secure card reader 52 with a terminal 100 that replaces several of the existing peripherals 51 and installing the gateway device 200 within the convenience store 10. The present invention requires no new wiring and utilizes existing peripheral cabling to supply power and ground to the terminal 100. The present invention may be implemented by fueling stations without replacing, updated or modifying existing point of sale systems 30, back office systems 20, fuel pumps 50 or forecourt controllers 40. Fueling stations can test or roll out the present invention in phases or by running a pilot test on one or two fuel pumps 50 or islands at a time. Fueling stations that adopt the present invention will not risk weeks of downtime and associated revenue losses or the high costs of replacing complete fueling systems. Notably, a fueling station may quickly and easily revert to its legacy systems if the present invention fails to correctly operate or is unsatisfactory.

Figure 7A:
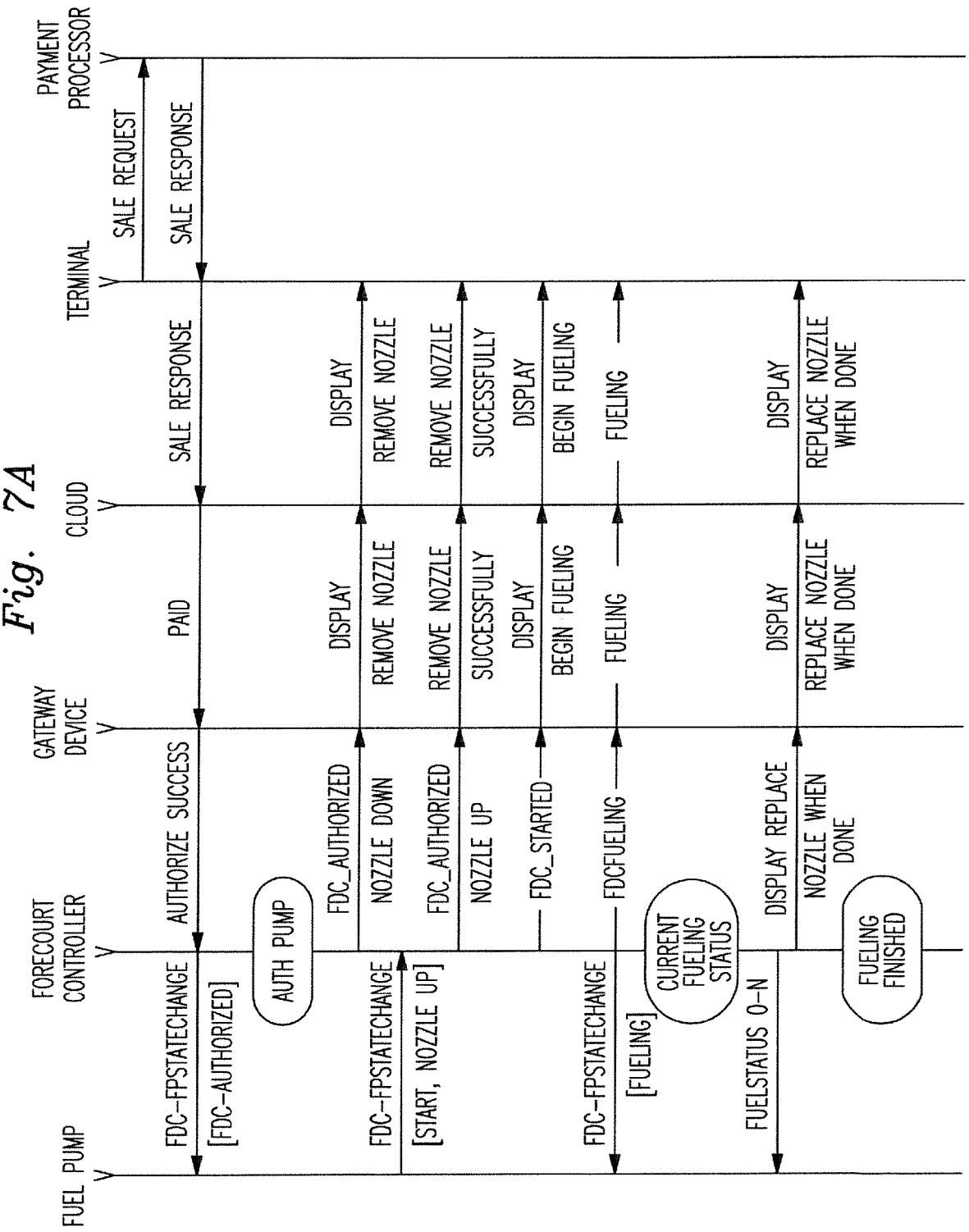
FIG. 7 is a sequence diagram illustrating a fueling transaction incorporating the invention wherein the transaction is pre-authorized.
Figure 7B:
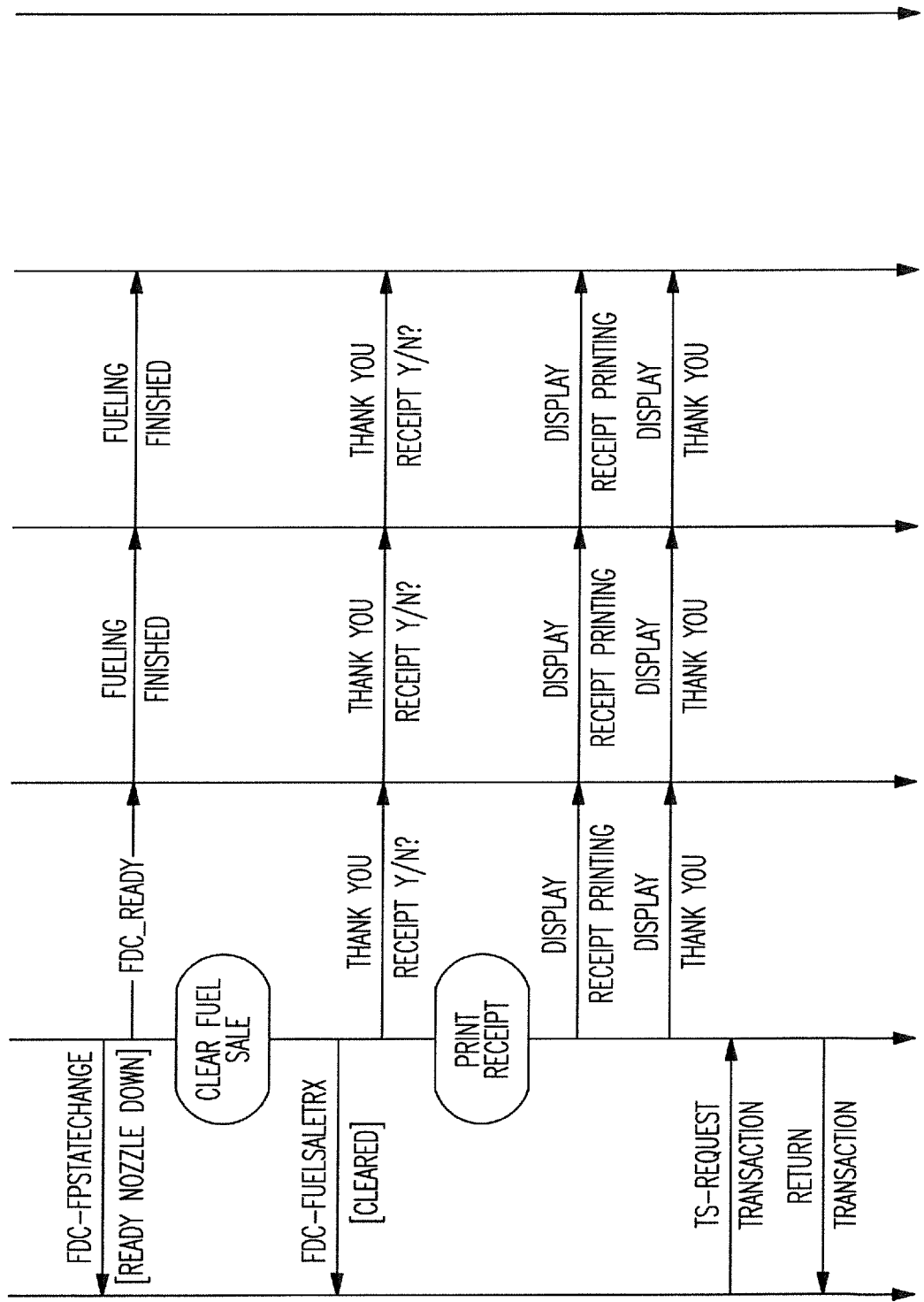
Figure 8A:
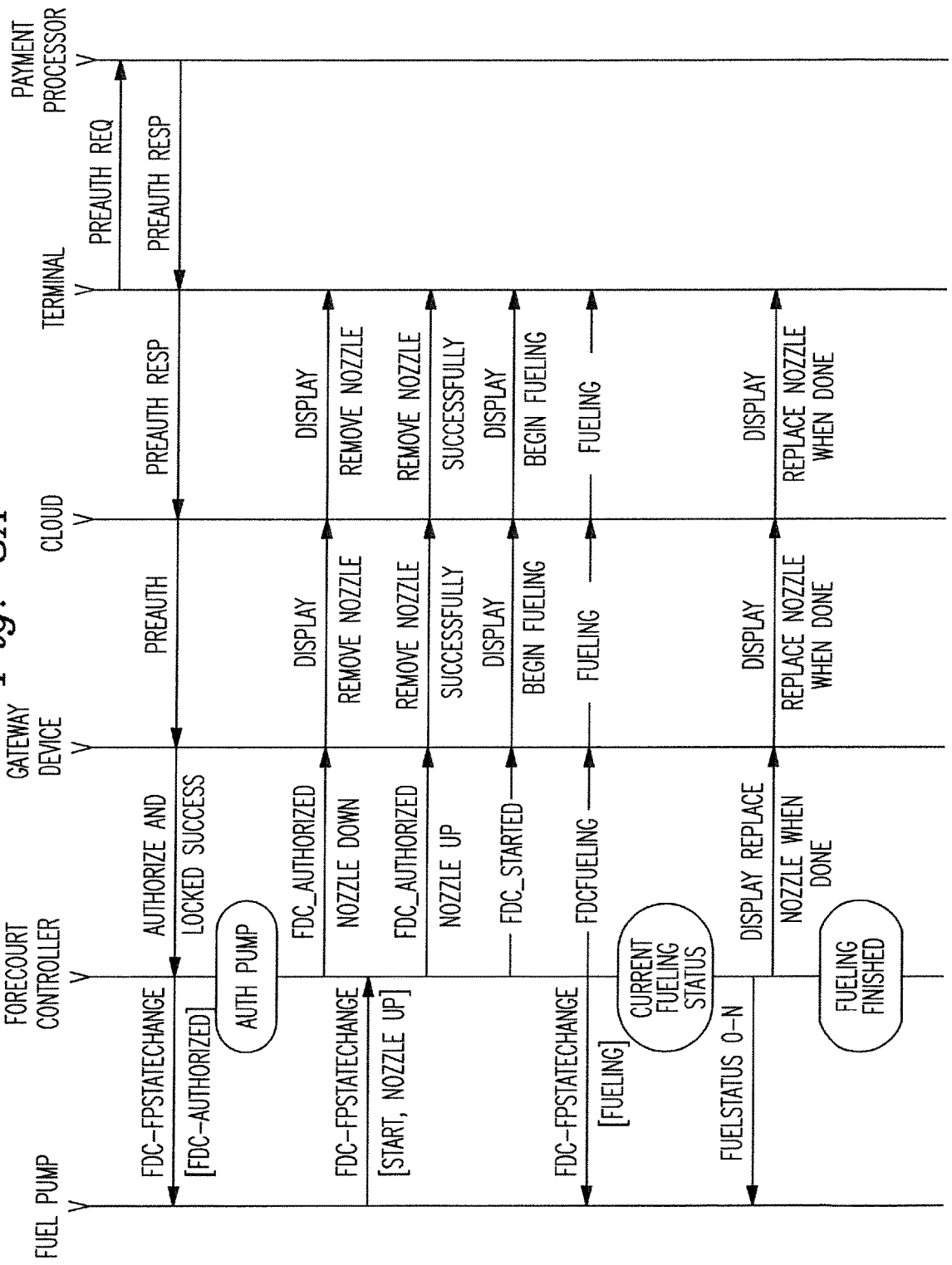
FIG. 8 is a sequence diagram illustrating a fueling transaction incorporating the invention wherein the transaction is pre-paid.
Figure 8B:
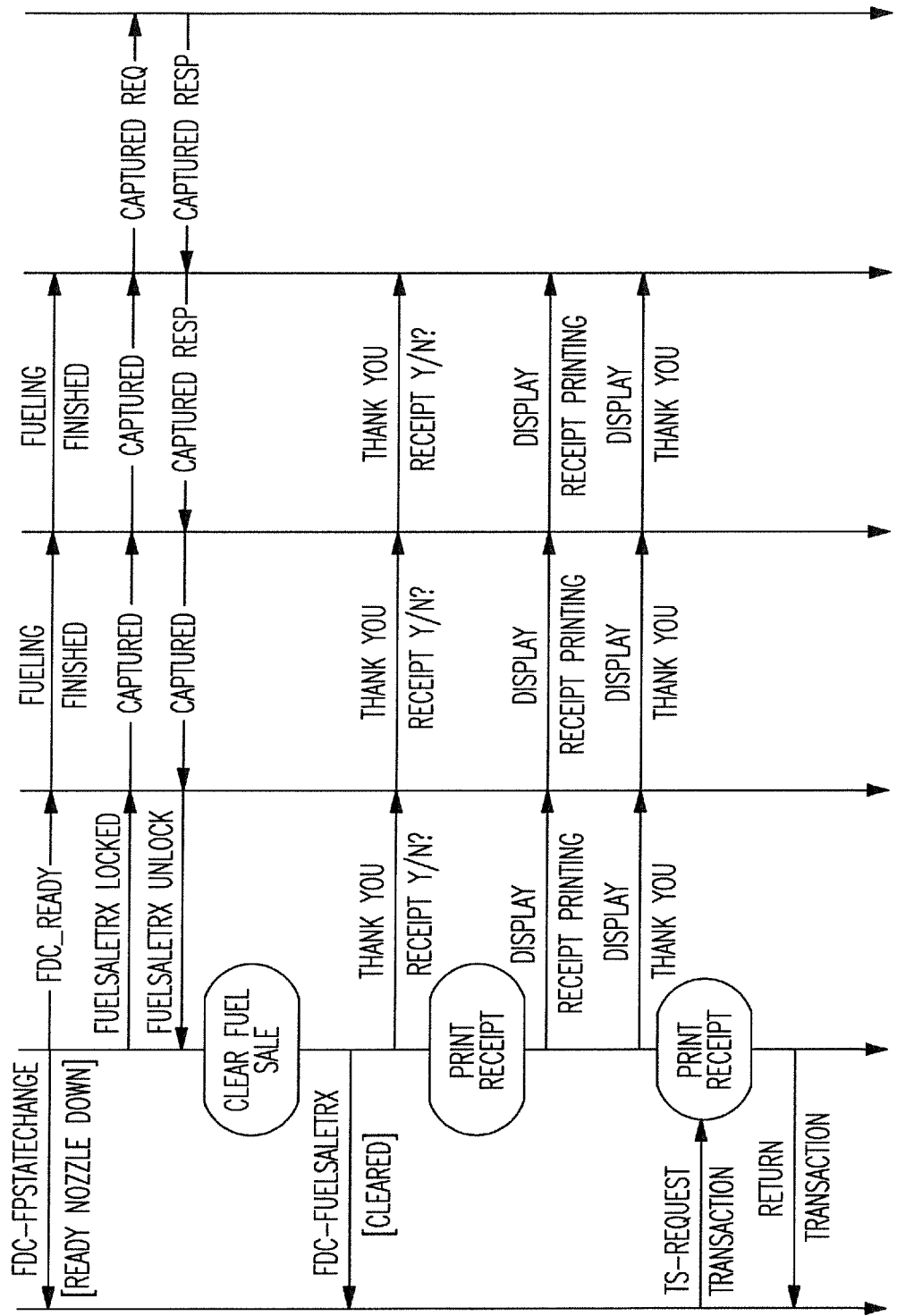

Attached as FIGS. 7 and 8 are two sequence diagrams that provide examples of ways a pay at the pump transaction may take place in accordance with the present invention. These two figures provide a sample of the flows. The flows and sequences can change easily depending upon the fuel pumps 50, forecourt controller 40, gateway device 200, the terminal 100 and/or the cloud services 99. Changes or differences in any of those components or their setup can alter the sequence and flow.

In the two example diagrams attached as FIGS. 7 and 8, the block names have the following meanings in accordance with this description:

POS (Pump)=the fuel pump and its peripherals
Fusion=the forecourt controller
Bridge=the in-store gateway device/proxy
Quantum Petro=the cloud service providing wireless communication between the terminal and in-store gateway device/proxy
IM20=a terminal
Host=the payment processor The sequence diagram of FIG. 7 depicts a card payment transaction using the terminal at the fuel dispenser, wherein upon presentment of the payment card, whether by swiping, EMV or contactless payment, the terminal's 100 payment processing software communicates directly with the payment processor 98 to submit a pre-authorization request and to receive a corresponding response and approval from the payment processor 98. Upon receipt of the response and approval, the terminal 100 wirelessly communicates that response, via the cloud 99 to the gateway device 200 which communicates a corresponding authorize and locked success to the forecourt controller 40. The forecourt controller 40 then communicates to fuel pump peripheral 51 a status change that pumping is authorized. The forecourt controller 40 communicates to the terminal 100 via the gateway device 200 that the nozzle is down. The gateway device communicates via the cloud 99 to the terminal 100 to display a "remove nozzle" instruction. Upon the customer activating the fuel pump 50, the fuel pump peripheral 51 communicates to the forecourt controller 40 that the fuel nozzle has been lifted or is "up." Corresponding communications are sent back to the terminal 100 via the gateway device 200 and cloud 99. Similarly, the forecourt controller 40 communicates with terminal 100 via the cloud 99 and gateway device 200 to instruct the terminal 100 to display "begin fueling." The fuel pump 50 instructs the terminal 100 to display the notice "fueling . . . ", and the fuel pump 50 instructs the terminal 100 to display the instruction "replace nozzle when done."

The fuel pump peripheral 51 and forecourt controller 40 acknowledge a state change that shows the nozzle has been replaced or fueling stopped by the customer. This causes the forecourt controller 40 to initiate two separate communications via the gateway device 200 to the cloud 99 to the terminal 100. The first communicates that fueling has finished. The second communications concern a "capture" instruction to finalize the payment and transaction. The terminal 100 receives this instruction and issues a captured request to the payment processor 98. The payment processor 99 returns a capture response approving the sale, which is communicated back to the forecourt controller 40. The forecourt controller 40 then communicates to the fuel pump 50 to clear the transaction, and back and forth communications are delivered between the terminal 100 and the forecourt controller 40 via the cloud 99 and gateway device 200 to prompt the customer whether to print a receipt and then having the forecourt controller 40 instruct the printer peripheral 55 to do so.

FIG. 8 depicts a similar sequence diagram showing a fuel dispensing transaction, the difference being that the transaction is pre-paid in this example.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure. The true scope and definition of the invention therefore is to be as set forth in the following claims.

I claim:

1. A fueling station payment system comprising:
    a fuel pump dispensing fuel to individual customers;
    a forecourt controller;
    a terminal disposed within said fuel pump, said terminal comprising a processing unit, a memory, a secure card reader, an encryption module and a wireless communication module, wherein said memory has computer-executable instructions stored thereon that, when executed by said processing unit, cause said terminal to execute a payment application for facilitating payment transactions;
    said terminal being in wireless communication with a payment processor via said wireless communication module such that encrypted secure payment information is transmitted directly between said terminal and said payment processor to complete said payment transactions by encrypting data directly using said encryption module such that said processing unit completes said payment transactions without communicating with said forecourt controller, wherein said payment transactions comprise payment authorization;
    at least one secure and tamper proof housing, wherein said terminal is arranged inside said at least one secure and tamper proof housing;
    one or more point of sale systems which communicate with said forecourt controller using established protocols; and
    a gateway device, wherein said terminal communicates wirelessly with said gateway device, and wherein said terminal and said forecourt controller communicate with each other through said gateway device to complete fuel dispensing transactions, and wherein said gateway device communicates with said forecourt controller using said established protocols of said point of sale systems.

2. The system of claim 1, wherein said terminal further comprises a display, an antenna, a power module, and a PIN pad.

3. The system of claim 1, wherein said wireless communication between said terminal and said payment processor and between said terminal and said gateway device occurs over the Internet through the cloud.

4. The system of claim 1, wherein said gateway device comprises a processing unit, a communications module and a forecourt controller interface.

5. The system of claim 4, wherein said gateway device further comprises a power module, an antenna and a programmable input module.

6. The system of claim 1, wherein said fuel pump further comprises a gas dispenser, a printer, a PIN pad and a display all of which are in direct communication with said forecourt controller.

7. A method of performing a fueling station payment transaction comprising the steps of:
    providing a fueling station payment system comprising a fuel pump dispensing fuel to individual customers; a forecourt controller; a terminal disposed within said fuel pump, said terminal comprising a processing unit, a memory, a secure card reader, an encryption module and a wireless communication module, wherein said memory has computer-executable instructions stored thereon that, when executed by said processing unit, cause said terminal to execute a payment application for facilitating payment transactions; at least one secure and tamper proof housing, wherein said terminal is arranged inside said at least one secure and tamper proof housing; one or more point of sale systems which communicate with said forecourt controller using established protocols; and a gateway device, wherein said terminal communicates wirelessly with said gateway device, and wherein said terminal and said forecourt controller communicate with each other through said gateway device to complete fuel dispensing, and wherein said gateway device communicates with said forecourt controller using said established protocols of said point of sale systems;

receiving secure payment information from a user through said terminal and encrypting said secure payment information directly using said encryption module; and wirelessly communicating said encrypted secure payment information directly to a payment processor via said wireless communication module to complete said payment transactions without communicating with said forecourt controller, wherein said payment transactions comprise payment authorization.

8. The method of claim 7, wherein said step of wirelessly communicating said encrypted secure payment information to said payment processor is performed through the cloud.

9. A method of retrofitting a fueling station transaction system in a fueling station having a fuel dispensing pump, a legacy smart card reader installed in said fuel dispensing pump, said legacy smart card reader in direct communication with a forecourt controller; the method comprising the steps of:

removing the legacy smart card reader from the fuel pump dispensing fuel to individual customers;

providing a terminal comprising a processing unit, a memory, a secure card reader, an encryption module and a wireless communication module, wherein said memory has computer-executable instructions stored thereon that, when executed by said processing unit, cause said terminal to execute a payment application for facilitating payment transactions; said terminal in wireless communication with a payment processor via said wireless communication module such that encrypted secure payment information is transmitted directly between the terminal and the payment processor to complete said payment transactions by encrypting data directly using said encryption module such that said processing unit completes said payment transactions without communicating with a forecourt controller, wherein said payment transactions comprise payment authorization;

providing at least one secure and tamper proof housing, wherein said terminal is arranged inside said at least one secure and tamper proof housing;

replacing the legacy secure card reader with the terminal; and providing a gateway device in communication with said forecourt controller and in wireless communication with the terminal, wherein one or more point of sale systems communicate with said forecourt controller using established protocols, wherein said terminal and said forecourt controller communicate with each other through said gateway device to complete fuel dispensing, and wherein said gateway device communicates with said forecourt controller using said established protocols of said point of sale systems.

10. The method of claim 9, further comprising the step of using a power source of the legacy secure card reader to power the terminal.

11. The system of claim 1, wherein said terminal is certified for facilitating said payment transactions.

12. The system of claim 11, wherein said payment application comprises scripts and rules that are certified for facilitating said payment transactions.

13. The system of claim 1, wherein said terminal is certified for Payment Card Industry (PCI); Europay, MasterCard, Visa (EMV); or near field communication (NFC) payment transactions.

14. The system of claim 1, wherein said payment transactions are performed only by said terminal and said payment processor.

15. The system of claim 14, wherein said payment transactions are not performed in the cloud.

16. The system of claim 1, wherein said wireless communication between said terminal and said payment processor does not occur over the Internet through the cloud.

17. The system of claim 16, wherein said wireless communication between said terminal and said gateway device occurs over the Internet through the cloud.

18. The system of claim 1, wherein said terminal further comprises a camera, and wherein said memory has further computer-executable instructions stored thereon that, when executed by said processing unit, cause said terminal to receive images captured by the camera, and perform bar code scanning or quick response (QR) code scanning based on said captured images.

* * * * *